United States Patent [19]

Gotoh et al.

[11] Patent Number: 4,850,096
[45] Date of Patent: Jul. 25, 1989

[54] METHOD OF JOINING PIPES

[75] Inventors: Taiji Gotoh; Hidetoshi Yamamoto; Kiyoshi Yamada, all of Kuwana, Japan

[73] Assignee: Mie Hooro Co., Ltd., Kuwana, Japan

[21] Appl. No.: 165,778

[22] Filed: Mar. 9, 1988

[30] Foreign Application Priority Data

May 23, 1987 [JP] Japan .................. 62-126703

[51] Int. Cl.[4] ............................................ B23P 11/00
[52] U.S. Cl. ......................................... 29/508; 29/520; 285/382.1; 285/382.7
[58] Field of Search ................. 29/237, 508, 520; 285/382.1, 382.2, 382.7, 339

[56] References Cited

U.S. PATENT DOCUMENTS

| 498,210 | 5/1893 | Hamlin | 285/382.1 X |
| 3,262,188 | 7/1966 | Briegel et al. | 29/520 X |
| 3,579,794 | 5/1971 | Powell | 29/237 |
| 3,895,832 | 7/1975 | Ellis et al. | 285/382.2 X |
| 4,298,222 | 11/1981 | Davies | 285/382.7 X |

FOREIGN PATENT DOCUMENTS 57-130729 8/1982 Japan .
2177174 1/1987 United Kingdom ............ 285/382.7

Primary Examiner—Mark Rosenbaum
Assistant Examiner—Frances Chin
Attorney, Agent, or Firm—Frishauf, Holtz, Goodman & Woodward

[57] ABSTRACT

A method of joining first and second piping materials with a C ring. The C ring has a sharp annular rim along the internal peripheral surface thereof on the pipe end side, and the C ring also has a cross-section such that a first cornered edge formed along the internal peripheral surface of the C ring on the annular gasket side and a second cornered edge formed along the external peripheral surface of the C ring on the pipe end side each define an acute angle. An end portion of the second piping material is inserted into the socket and into the C ring. The piping material are held by means of a pair of clamping jaws each having a tapered plane of clamping action opposing each other, and the jaws are then moved closer to each other along the axis of the pipes, respectively, for pressurizing the piping materials to effect plastic deformation of at least the maximum diameter portion at the end of the first piping material to deform the gasket and clamp the piping materials together.

9 Claims, 3 Drawing Sheets

METHOD OF JOINING PIPES

BACKGROUND OF THE INVENTION

This invention relates to a method of joining piping materials, which is suitable for joining two thin-wall stainless steel pipes and for joining a metallic pipe and a metallic pipe coupling.

There has usually been practiced as a method for joining piping material such as metallic pipes, pipe couplings, etc. to thread end portions of the piping materials and screw one piping material into the other. However, such method has not been satisfactory with respect to workability, pressure resistance, airtightness, etc. Under such circumstances, the present applicant has previously invented a joining method to form a diametrally enlarged portion at an end portion of one piping material, i.e. a tapered portion, to which an annular gasket having a wedge-shaped cross-section is interposed and further an end portion of the other piping material is inserted, followed by application of pressure from the periphery to achieve plastic deformation of the diametrally enlarged portion and proposed it in Japanese Provisional Patent Publication No. 130729/1982.

However, in the piping materials having been joined according to such method, for example, using stainless steel pipes each having an outer diameter of 22.2 mm and a wall thickness of 1.0 mm, and an ethylene propylene rubber as the annular gasket, the piping materials exhibit a pressure resistance of about 30 kgf/cm$^2$ and a pull-out resistance of about 100 kgf. Accordingly, there has been desired a method of joining piping materials to be developed, according to which the piping materials can be joined with superior airtightness, pressure resistance and pull-out resistance.

SUMMARY OF THE INVENTION

This invention is directed to overcome the above problems and to provide a method of joining piping materials which can give excellent airtightness, pressure resistance and pull-out resistance.

The method of joining piping materials according to this invention is characterized by, forming at an end portion of one piping material to be joined a socket comprising a tapered portion which is diametrically enlarged gradually toward the pipe end and a maximum diameter portion extending from the maximum diameter portion of said tapered portion; fitting an annular gasket having a wedge-shaped cross-section along the internal peripheral surface of said tapered portion in the socket to be in intimate contact therewith; fitting a C ring having a C-shaped plane along the internal peripheral surface of the maximum diameter portion and onto the face of the annular gasket on the pipe end side so as to be in intimate contact therewith, a sharp annular rim being provided along the internal peripheral surface of said C ring on the pipe end side, and said C ring having a cross-section such that a cornered edge formed along the internal peripheral surface of said C ring on the annular gasket side and a cornered edge formed along the external peripheral surface of said ring on the pipe end side each are of an acute angle; inserting an end portion of the other piping material thereto; and then holding the piping materials by means of a pair of clamping jaws each having a tapered plane of clamping action opposing to each other, followed by moving the jaws closer to each other along the axis of the pipes, respectively, for pressurizing the piping materials to effect plastic deformation of the maximum diameter portion.

DETAILED DESCRIPTION

Figure 1:
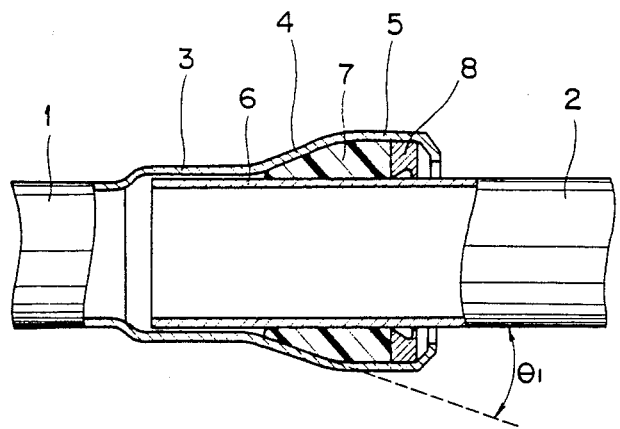
FIGS. 1 to 3 each show a fragmental cross-sectional view illustrating the joining method according to this invention.

As shown in FIG. 1, first formed, at the end portion of one of the two piping materials 1 and 2 which are to be joined, is a socket comprised of a diametrically enlarged portion 3 having a diameter slightly enlarged such that the other piping material 2 may be inserted thereto, a tapered portion 4 gradually enlarged diametrically from the first-mentioned diametrically enlarged portion 3 toward the pipe end and a maximum diameter portion 5 extending from said tapered portion 4 substantially in parallel with the pipe axis. The tapered portion 4 is preferably allowed to form an angle $\theta_1$ of about 10° to 30° with the center axis of the piping material 1 in a cross-section cut along the plane including the axis of said piping material 1.

A annular gasket 7 having a wedge-shaped cross-section is disposed in intimate contact with the internal peripheral surface of the tapered portion 4. One or a plural number of C rings 8 is disposed in intimate contact with the internal peripheral surface of the maximum diameter portion 5 and with the pipe end side face of the annular gasket 7. The end portion 6 of the other piping material 2 is inserted thereto as seen in FIG. 1.

Figure 4:
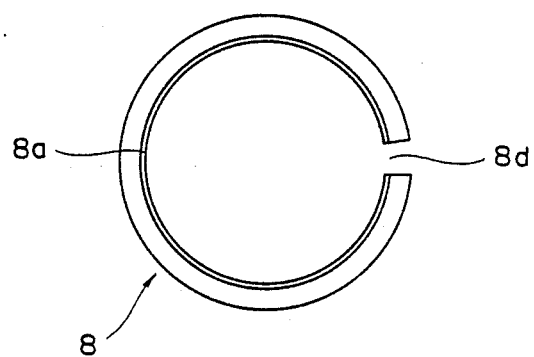
FIG. 4 shows a plan view of the C ring.
Figure 5:
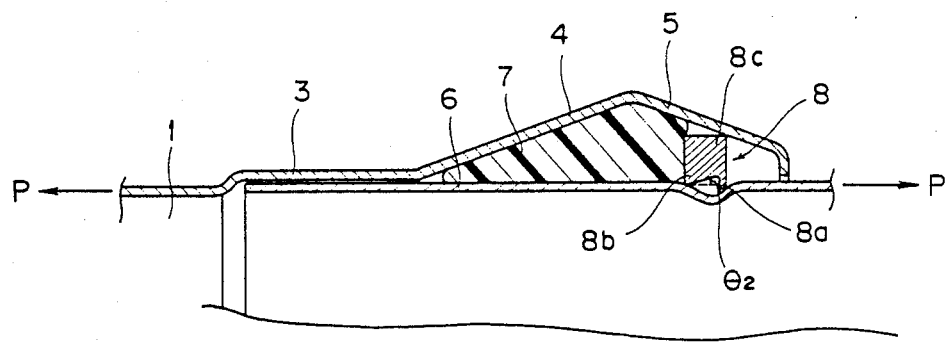
FIG. 5 shows a fragmental cross-sectional view illustrating a state wherein the C ring is impressed against the external peripheral surface of the end portion of the other piping material.

The C ring 8 is formed by stamping a steel plate such that the stamped ring has a C-shaped plane, as shown in FIG. 4, a sharp rim 8a (see also FIG. 5) being provided on the pipe end side along the entire internal periphery which is to be impressed against the external peripheral surface of the end portion 6 of the other piping material 2. As shown in FIG. 5 illustrating the cross-sectional configuration, said C ring 8 has a construction such that the cornered edge 8b formed along the internal peripheral surface of the ring 8 on the annular gasket side has an acute angle, preferably such that the angle $\theta_2$ formed between the internal peripheral surface of the ring 8 forming this cornered edge 8b and the external peripheral surface of the end portion 6 of the piping material 2 may be about 5° to 15°, more preferably 10°, and that the cornered edge 8c formed along the external peripheral surface of the ring 8 on the pipe end side also has an acute angle.

Figure 2:
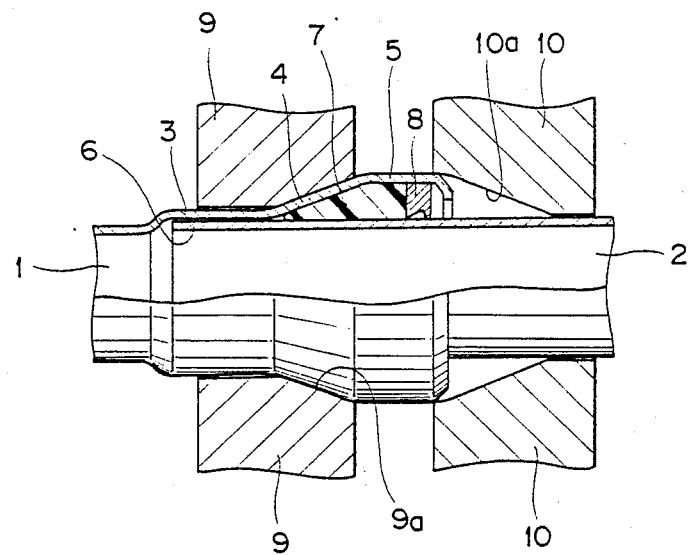

The tapered portion 4 of the one piping material 1 is held by a first outer clamping jaw 9 having a tapered plane of clamping action 9a as shown in FIG. 2, and the other piping material 2 is held by a second outer clamping jaw 10 having a tapered plane of clamping action 10a which opposes that of said first clamping jaw 9. The jaws 9 and 10 are both moved closer to each other along the axis of the piping materials 1 and 2 to effect plastic deformation of the maximum diameter portion 5 of the socket such that said maximum diameter portion 5 may diametrically be reduced gradually toward the piping material 2 by the plane of clamping action 10a of the second clamping jaw 10 to form another tapered portion as shown in FIG. 3.

As a result, the annular gasket 7 is pressurized strongly by the two jaws 9 and 10 to be press-fitted tightly between the internal peripheral surface of the socket and the external peripheral surface of the end portion 6 of the other piping material 2 due to wedging action.

Figure 3:
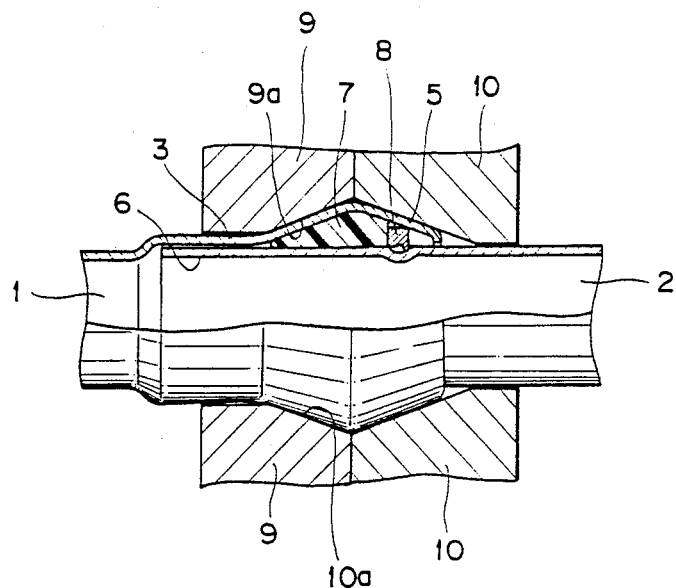

Thus, with the plastic deformation of the maximum diameter portion 5 of the socket, the C ring 8 comes to have a reduced internal diameter compared with the original size, and the rim 8a and also the cornered edge 8b will be impressed against the external peripheral surface of the end portion 6 of the other piping material 2; whereas the cornered edge 8c will be impressed against the internal peripheral surface of the maximum diameter portion 5, respectively, as shown in FIGS. 3 and 5. In this process, since the cornered edge 8b of the C ring 8 is impressed against the external peripheral surface of the end portion 6 of the piping material 2 according to the principle of leverage in such a way that the rim 8a acts as a supporting point and the cornered edge 8c acts as a point of force application, the C ring never slips along the axis of the pipe even when the maximum diameter portion 5 undergoes plastic deformation.

Also, in the C ring 8 to be used according to this invention, the cornered edge 8b formed along the internal peripheral surface of the ring on the annular gasket side and the cornered edge 8c formed along the external peripheral surface on the pipe end side both form an acute angle. Accordingly, when a strong pull-out force is exerted in the direction as shown by the arrow P in FIG. 5, a pull-out resistance which resists the pull-out force mentioned above will be exhibited since said cornered angled edges 8b and 8c are impressed against the external peripheral surface of the end portion 6 of the other piping material 2 and the internal peripheral surface of the maximum diameter portion 5 of the socket, respectively. Consequently, a joint having extremely high airtightness, pressure resistance and pull-out resistance can be achieved.

As a result of an experiment using stainless steel pipes each having an outer diameter of 22.2 mm and a wall thickness of 1.0 mm, an ethylene propylene rubber as the annular gasket, and a C ring having a ring width of 1.8 mm, a height of 2.65 mm in cross-section, a rim tip width of 0.25 mm, and an impression depth of 0.35 mm with the angle $\theta_2 = 10°$, the thus joined piping materials could bear an internal pressure of 50 kgf/cm$^2$, and further they were not released from each other even when a pulling load of 1,109 kgf was applied thereto.

Figure 6:
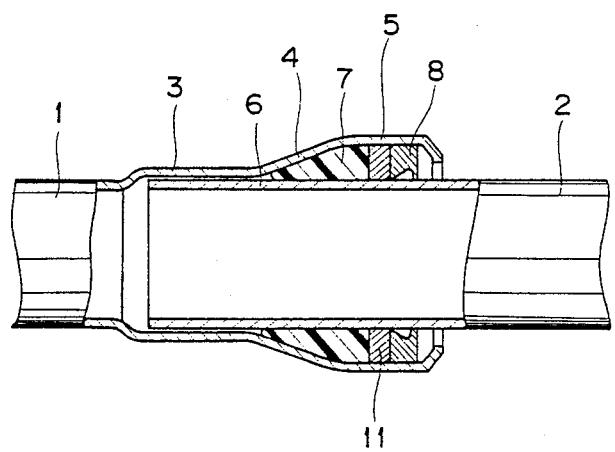
FIG. 6 shows a fragmental cross-sectional view illustrating a joining method where a back-up ring is used.

Also, according to the joining method of this invention, the possibility that the annular gasket 7 is caught in the gap 8d of the C ring 8 during the pressurizing process can be obviated by interposing a back-up ring 11 between the annular gasket 7 and the C ring 8 as shown in FIG. 6, and also further improved airtightness and pressure resistance can be obtained thereby.

It should be noted that the back-up ring 11 may be made of any material so long as it can be fitted in intimate contact with the internal peripheral surface of the maximum diameter portion of the socket and also can prevent the annular gasket 7 from being caught in the gap of the C ring 8.

As can be seen clearly from the above description, according to the joining method of this invention, the piping materials can be joined with excellent airtightness, pressure resistance and pull-out resistance simply by pressurizing the tip end portion of the socket of the piping material toward the axis of said pipe, since the C ring has an annular rim and sharp cornered edges.

We claim:

1. A method of joining first and second piping materials comprising:

forming a socket at an end portion of said first piping material, said socket including an outwardly tapered portion which is diametrically enlarged gradually toward the pipe end, and a maximum diameter portion extending from the maximum diameter end of said tapered portion;

fitting an annular resilient gasket having a wedge-shaped cross-section along the internal peripheral surface of said tapered portion in said socket so as to be in contact with said internal peripheral surface of said tapered portion;

fitting a C ring into said maximum diameter portion of said socket so as to extend along the internal peripheral surface of said maximum diameter portion and so as to be adjacent a face of said annular gasket on the pipe end side of said annular gasket, said C ring having a C shape in a plane transverse to the longitudinal axis of said maximum diameter portion and also having a sharp annular rim projecting inwardly therefrom and extending along the internal peripheral surface of said C ring on the pipe end side of said C ring, and said C ring further having a cross-sectional shape including a first cornered edge formed along an internal peripheral surface of said C ring on the annular gasket side thereof, and a second cornered edge formed along the external peripheral surface of said C ring on the pipe end side thereof, each of said cornered edges defining an acute angle and a depression being formed in said C ring between said first cornered edge and said sharp annular rim;

inserting an end portion of said second piping material into said socket and within central openings of said gasket and C ring;

arranging a pair of clamping jaws around the outside of said first and second piping materials, said clamping jaws having respective tapered surfaces of clamping action opposing to each other, one of said clamping jaws being arranged around at least a portion of said tapered portion; and then moving said clamping jaws toward each other along the longitudinal axis of said piping materials, and pressurizing the ends of said piping materials by pressing said tapered surfaces of clamping action thereagainst to effect plastic deformation of at least a portion of said maximum diameter portion of said first piping material inwardly thereof toward said second piping material to compress said annular gasket and to press said C ring against said second piping material which is inserted therein.

2. The method of joining piping materials according to claim 1, comprising interposing a back-up ring between said annular gasket and said C ring to prevent said gasket from entering under said C ring.

3. The method of joining piping materials according to claim 1, wherein said outwardly tapered portion of said first piping material has a slope of about 10° to 30° relative to the longitudinal axis of said first piping material.

4. The method of joining piping materials according to claim 1, wherein said internal peripheral surface of said C ring extends from said first cornered edge and faces said second piping material which is inserted therein, an angle of 5° to 15° being formed between said internal peripheral surface of said C ring and an external peripheral surface of said second piping material.

5. The method of joining piping materials according to claim 1, wherein at least said clamping jaw which is arranged around at least a portion of said tapered portion of said first piping material has a tapered plane of clamping action whose slope corresponds with the slope of said tapered portion of said first piping material.

6. The method of joining piping materials according to claim 5, wherein the other of said clamping jaws has a tapered plane of clamping action which has a maximum diameter portion adjacent said maximum diameter portion of said first piping material for elastically deforming the free end portion of said maximum diameter portion of said first piping material in such a manner as to form an inwardly tapered portion of said first piping material which tapers inwardly toward said second piping material, thereby forming a generally V-shaped form of said end portion of said first piping material.

7. The method of joining piping materials according to claim 1, wherein the other of said clamping jaws has a tapered plane of clamping action which has a maximum diameter portion adjacent said maximum diameter portion of said first piping material for elastically deforming the free end portion of said maximum diameter portion of said first piping material in such a manner as to form an inwardly tapered portion of said first piping material which tapers inwardly toward said second piping material, thereby forming a generally V-shaped form of said end portion of said first piping material.

8. The method of joining piping materials according to claim 6, wherein said moving and pressurizing step comprises pressing said C ring against said second piping material so as to form a depression in said second piping material at least in the vicinity of said sharp annular rim of said C ring, said sharp annular rim being at least partially engaged in at least a portion of said depression of said second piping material.

9. The method of joining piping materials according to claim 1, wherein said moving and pressurizing step comprises pressing said C ring against said second piping material so as to form a depression in said second piping material at least in the vicinity of said sharp annular rim of said C ring, said sharp annular rim being at least partially engaged in at least a portion of said depression of said second piping material.

* * * * *